United States Patent [19]
De Jongh et al.

[11] 3,776,330
[45] Dec. 4, 1973

[54] BRAKING DEVICE FOR ADJUSTMENT APPARATUS

[75] Inventors: Rudi Theodoor De Jongh, Munich; Helmut Oskar Stickdorn, Hohenkirchen, both of Germany

[73] Assignee: Bunker Ramo Corporation, Oak Brook, Ill.

[22] Filed: June 15, 1972

[21] Appl. No.: 263,236

[30] Foreign Application Priority Data
June 25, 1971  Germany................... P 21 31 654.1

[52] U.S. Cl...................................... 188/67, 74/531
[51] Int. Cl.............................................. B65h 59/10
[58] Field of Search.......................... 188/67, 196 P; 74/531

[56] References Cited
UNITED STATES PATENTS
2,750,994   6/1956   Howell, Jr.......................... 74/531 X
2,932,214   4/1960   Crouse............................... 74/531 X
3,129,400   4/1964   Hartman............................ 74/531 X
3,319,484   5/1967   Prest................................... 74/531

*Primary Examiner*—George E. A. Halvosa
*Attorney*—Frederick M. Arbuckle

[57] ABSTRACT

A braking device for use with adjustment apparatus such as a potentiometer having a movable shaft partially encompassed by a housing member. A braking element is concentrically positioned around the periphery of the shaft between the shaft and the encompassing surface of the housing member. A portion of the braking element has spaced-apart slits extending from an edge of the element across part of the width of the element. These slits form radially resilient segments frictionally engaged with both the periphery of the shaft and the encompassing surface of the housing member.

5 Claims, 4 Drawing Figures

PATENTED DEC 4 1973

3,776,330

BRAKING DEVICE FOR ADJUSTMENT APPARATUS

BACKGROUND OF THE INVENTION

1. Field of the Invention

This invention relates to the field of braking devices for adjustment apparatus, particularly braking devices for use with potentiometers.

2. Description of the Prior Art

In adjustment apparatus such as potentiometers where the resistance is adjusted by rotation of a shaft with respect to a support member, it is desirable to provide a well-defined torque resisting the rotation of the shaft. This torque must be sufficient to prevent movement of the shaft by normal environmental vibrations acting upon the shaft; but on the other hand, the torque must be low enough to allow easy adjustment of the potentiometer by rotation of the shaft. The problem of providing a movable shaft with a well-defined torque is not limited to potentiometers, but is frequently encountered in other scale actuating apparatus in which the position of a shaft or the number of revolutions performed by a shaft must be controlled.

In a known potentiometer, a prior art braking device is provided which consists of a corrugated metal strip inserted between the shaft and the sleeve-like housing around the shaft. The corrugated deformations of the metal strip provide radial forces against the shaft resulting in frictional drag which provides a torque between the shaft and the housing. A disadvantage of this prior art braking device is the reduction of the initial torque which may occur as a result of plastic deformation of the strip resulting from compressive forces acting against the strip. Plastic deformation of the strip can occur when the shaft is pressed against the housing by a radial force. Plastic deformation readily occurs in the corrugated metal strip, because the stresses are concentrated in the round deformed regions of the strip. In order to reduce the risk of permanent deformation of the metal strip by radial movement of the shaft, the shaft must be very accurately supported within its housing. Consequently, the cost of manufacture of this type of potentiometer is increased by the necessity of providing close tolerances.

SUMMARY OF THE INVENTION

It is an object of this invention to provide an improved, economical braking device for adjustment apparatus, the braking device providing a well-defined torque when a shaft of the apparatus is moved, this well-defined torque being maintained during the entire lifetime of the adjustment apparatus.

According to this invention, the braking element consists of a strip or ribbon having radially resilient segments on a portion formed by slits which are provided at intervals on the strip. The slits extend from the edge of the strip across part of the width of the strip perpendicular to the longitudinal direction of the strip.

This braking strip is wound around the periphery of the adjustment device's shaft, providing a sleeve about the shaft with a slight gap where the ends of the strip approach each other. The resulting sleeve, however, does not precisely assume the form of a cylinder. The segments between two neighboring slits tend to tangentially contact the periphery of the shaft, since the forces resulting from the bending of the braking strip are interrupted by the slits. Consequently, portions of the segments centrally located between the slits engage the periphery of the shaft tangentially along relatively straight lines or flat surfaces. The edges of the slits and the continuous unslit portion of the strip bear against the housing member. Since the resulting friction between the housing member and the braking strip is greater than the friction between the braking strip and the shaft, the braking strip is retained on the housing member and does not rotate when the shaft is rotated.

When a radial force presses the shaft against the housing member, there is no plastic deformation of the braking strip, since the radii of curvature of the bent sections of the braking strip undergo only slight changes during radial movement of the shaft. Further, the resulting torque between the shaft and the housing member is not significantly influenced by irregularities in the shaft dimension or in the surface finish of the shaft, since the braking strip engages the shaft along narrow, axially extending surfaces rather than along sharp edges. A braking strip of this type is easy to manufacture at low cost and is readily installed in the adjustment device.

BRIEF DESCRIPTION OF THE DRAWINGS

The invention will now be described in detail with reference to the accompanying drawings representing a preferred embodiment of the braking device for use with an adjustment apparatus. In the drawings.

DESCRIPTION OF THE PREFERRED EMBODIMENTS

Figure 1:
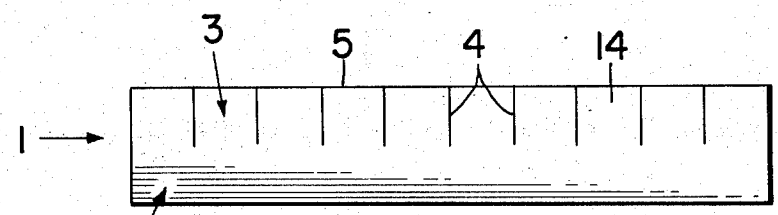
FIG. 1 shows a braking strip.
Figure 2:
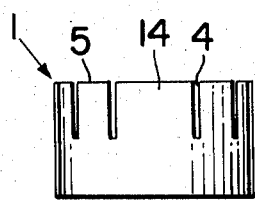
FIG. 2 is a view of the braking strip of FIG. 1 wound to form a cylinder or sleeve.
Figure 3:
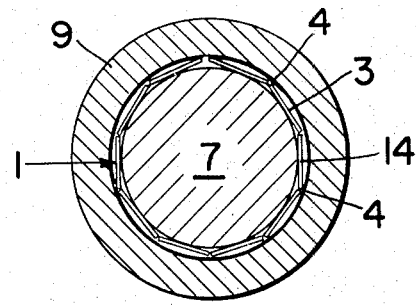
FIG. 3 is a transverse cross section through an adjustment apparatus showing the braking strip installed between a shaft and a housing member.

Braking strip 1 shown in FIGS. 1–3 is a metal strip consisting of two portions 2 and 3. A first portion 3 is provided with slits 4. Slits 4 extend perpendicularly from edge 5 of the strip across about three-fourths of the width of the strip. Interslit segments 14 are formed between slits 4. The remaining second portion is unslit portion 2 formed integral with slit portion 3.

Figure 4:
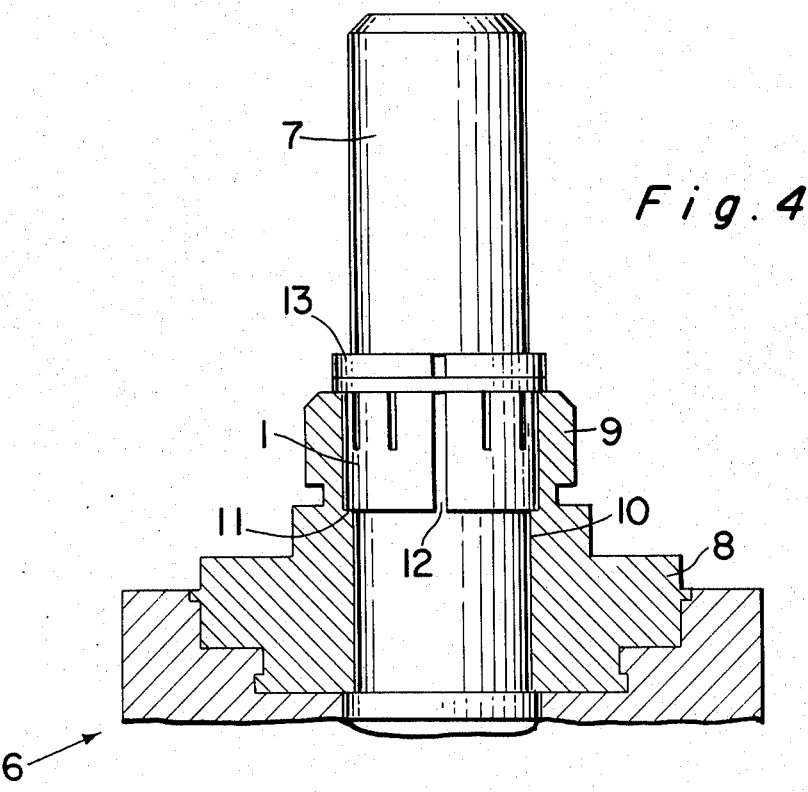
FIG. 4 is a longitudinal section through an adjustment apparatus having a braking strip installed therein.

FIG. 4 shows metal strip 1 installed in an adjustment apparatus, for example, a potentiometer. Adjustment apparatus 6 comprises a shaft 7 rotatably supported in a support or housing member 8. Housing member 8 can function as a housing of adjustment device 6. Housing member 8 is provided with an axial extension 9 which has a greater internal diameter than the neighboring bearing portion 10 and is set off from it by a shoulder 11. Metal strip 1 shown in FIGS. 1–3 is inserted into the resulting annular space between shaft 7 and extension 9. The thickness of the strip may be equal to approximately one-half the radial distance between the periphery of the shaft and the encompassing surface of the housing. The length of metal strip 1 is selected so that the strip wound around shaft 7 forms a cylindrical surface with a small gap 12 left between its ends. In order to prevent metal strip 1 from disengaging from shaft 7, a safety ring 13 is provided on the shaft.

The following dimensions provide an example of a suitable size for an adjustment apparatus and a metal strip. The shaft diameter may be 0.250 inch and the internal diameter of extension 9 in which metal strip 1 is inserted may be 0.264 inch. The width of the metal strip may be 0.236 inch and its length 0.810 inch. The metal strip may be made of a beryllium copper alloy, because of its suitable elastic properties, wear resistance, and formability. The strip may be provided with nine slits along its length so that 10 segments 14 result (FIGS. 1 and 3).

When metal strip 1 is wound around shaft 7 or inserted in housing member 8, the metal strip does not form a surface which is precisely cylindrical, because (disregarding gap 12) the curvature of the two portions 2 and 3 differs. While the surface of unslit portion 2 assumes a cylindrical form, the surface of slit containing portion 3 assumes the form of a polygon with sides formed by segments 14. The edges defined by slits 4 of segments 14 bear against housing member 8, while the central portion of each segment contact shaft 7 along a small axially extending area. FIG. 3 shows the position of metal strip 1 in support member 8. For simplicity, housing member 8 is shown as a hollow cylinder. In actuality, the surface of unslit portion 2 of metal strip 1 also does not form a precise cylinder. The strip is more strongly bent near the slit ends than in other zones of the continuous strip, because of the increased tension in the zones adjacent the end of slits 4. Consequently, unslit portion 2 bears against housing member 8 with a contact pressure varying over the encompassing surface of support member 8. It is possible that alternate portions of the unslit portion may be in contact with housing member 8 and shaft 7.

The resulting torque resisting the actuating movement of the shaft depends essentially upon the shaft diameter, the internal diameter of the housing member, the number of slits, the dimensions of the metal strip, and the material of the strip. A proper, well-defined torque can be obtained by proper selection of the above parameters.

Variations in the radial dimension of the annular space between the periphery of the shaft and the encompassing surface of the housing member (resulting from tolerances in the shaft diameter and the internal diameter of the housing member) can be substantial without affecting the torque, since the thickness of the braking strip and the length of the individual spring-like segments can be selected to compensate for differences in the size of the annular space. It is advantageous to provide a large number of spring-like segments by keeping the distance between two neighboring slits small, so that the individual braking forces acting against the periphery of the shaft are very small.

Braking strip 1 can be employed wherever a well-defined frictional force is desired between a housing or support member and a shaft. Thus, the braking strip can also be used to provide a well-defined axial force acting upon a shaft which moves in an axial direction in a housing member.

In other embodiments of the device, the braking strip may be manufactured from a plastic material rather than from a metal.

From the foregoing, it can be readily realized that this invention can assume various embodiments. Thus, it is to be understood that the invention is not limited to the specific embodiments described herein, but is to be limited only by the appended claims.

What is claimed is:

1. In a device wherein a shaft having a circular cross section is positioned for movement within a circular bore extending through a housing member, the walls of the bore in the housing member rotationally supporting the shaft throughout a substantial axial longitudinal extent of the bore, with the housing being counterbored at one extremity of the bore to provide an annular clearance between the periphery of the shaft and the internal surface of the counterbore, a braking mechanism for imposing a desired degree of frictional restraint to rotation of the shaft relative to the housing member, said braking mechanism comprising:

a strip of spring material having a thickness substantially less than the radial distance between the periphery of said shaft and the internal surface of said counterbore, the length of said strip being less than the internal circumference of said counterbore, and the width of said strip not being substantially in excess of the axial length of said counterbore, said strip having a first portion extending longitudinally between the ends thereof, said first portion being provided at intervals with slits positioned with the longitudinal axes of said slits intersecting the longitudinal axis of said strip, the portions of said strip between said slits defining segments of said strip each segment having two edges each of which is adjacent a respectively different one of two slits, said strip having a second portion without slits, said second portion being integral with said first portion and extending intermediate said ends, said strip being positioned and resiliently restrained against rotation within said counterbore by the spring action of the second portion of the strip in combination with the edges of the segments in said first portion both acting against the internal surface of said counterbore, with substantially only the edges of said segments at their free ends engaging said internal surface, the periphery of said shaft engaging the segments of said strip, the degree of said restraint affording a degree of friction between the strip and the internal surface of said counterbore which is greater than the friction between the strip segments and the shaft.

2. A device according to claim 1 wherein the length of said slits is less than three-fourths the width of said strip.

3. A device according to claim 1 wherein the central portion of each segment defined by said slits contacts the periphery of the shaft along a relatively small axially extending area thereon.

4. A device according to claim 3 wherein said slits are perpendicular to one longitudinal edge of said strip.

5. A device according to claim 3 wherein the thickness of said strip is not greater than one-half the radial distance between the periphery of said shaft and the internal surface of said counterbore.

* * * * *